(12) United States Patent
Hintermeister (10) Patent No.: US 10,755,631 B2
(45) Date of Patent: *Aug. 25, 2020

(54) DISPLAY REGION FILTERING BASED ON PRIORITY

(71) Applicant: International Business Machines Corporation, Armonk, NY (US)

(72) Inventor: Gregory R. Hintermeister, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/512,480

(22) Filed: Jul. 16, 2019

(65) Prior Publication Data
US 2019/0347984 A1   Nov. 14, 2019

Related U.S. Application Data

(63) Continuation of application No. 15/978,903, filed on May 14, 2018.

(51) Int. Cl.
*G09G 3/32* (2016.01)
*G09G 3/3208* (2016.01)
*G06F 3/0482* (2013.01)

(52) U.S. Cl.
CPC ......... *G09G 3/3208* (2013.01); *G06F 3/0482* (2013.01); *G09G 2320/0295* (2013.01); *G09G 2320/08* (2013.01); *G09G 2330/021* (2013.01); *G09G 2340/0407* (2013.01); *G09G 2354/00* (2013.01)

(58) Field of Classification Search
CPC ............. G09G 3/3208; G09G 2320/08; G09G 2320/0295; G09G 2354/00; G09G 2330/021; G09G 2340/0407; G06F 3/0482
See application file for complete search history.

(56) References Cited

U.S. PATENT DOCUMENTS 9,436,269 B2   9/2016 Yang
2003/0135288 A1   7/2003 Ranganathan et al.
(Continued)

OTHER PUBLICATIONS

Wee et al., "Adaptive Display Power Management for OLED Displays," MobileGames '12: Proceedings of the first ACM International Workshop on Mobile Gaming, Aug. 2012, pp. 25-30.
(Continued)

*Primary Examiner* — Liliana Cerullo
(74) *Attorney, Agent, or Firm* — James L. Olson (57) ABSTRACT

Aspects of the present disclosure relate to display region filtering. A pixel priority value for each of a plurality of pixels on a display region are assigned in response to identifying portions of the display region for prioritization, wherein the pixel priority values indicate a relative importance of each of the pixels, respectively, for viewing based on a magnitude of the pixel priority values. The pixel priority value of each pixel is compared to a first pixel priority threshold to identify pixels of the plurality of pixels having pixel priority values which do not satisfy the first pixel priority threshold. The pixels of the plurality of pixels having pixel priority values which do not satisfy the first pixel priority threshold are deactivated, wherein a subset of pixels satisfies the first pixel priority threshold and remain active.

16 Claims, 4 Drawing Sheets

(56) References Cited

U.S. PATENT DOCUMENTS

| | | | |
|---|---|---|---|
| 2006/0087502 A1 | 4/2006 | Karidis et al. | |
| 2008/0204460 A1* | 8/2008 | Marinkovic | G06F 1/3203 345/502 |
| 2009/0027403 A1 | 1/2009 | Jung | |
| 2009/0199134 A1 | 8/2009 | Murayama | |
| 2010/0026724 A1* | 2/2010 | Goto | G09G 3/20 345/690 |
| 2011/0102471 A1* | 5/2011 | Hsu | G09G 3/3614 345/690 |
| 2012/0050338 A1 | 3/2012 | Rabii | |
| 2012/0188287 A1* | 7/2012 | Wurzel | G06F 1/203 345/690 |
| 2013/0314454 A1 | 11/2013 | Jin et al. | |
| 2015/0061988 A1 | 3/2015 | Galu, Jr. | |
| 2016/0055823 A1 | 2/2016 | Feng et al. | |
| 2016/0322023 A1 | 11/2016 | Kumar et al. | |
| 2017/0206862 A1 | 7/2017 | Jha et al. | |
| 2017/0278484 A1 | 9/2017 | Chen et al. | |

OTHER PUBLICATIONS

Ravenscraft, E., "Pixel OFF Turns Off Pixels to Save Battery on AMOLED Displays," lifehacker.com, Apr. 7, 2015, pp. 1-2, https://lifehacker.com/pixel-off-turns-off-pixels-to-save-battery-on-amoled-di-1696157699.

Hintermeister, G., "Display Region Filtering Based on Priority", U.S. Appl. No. 15/978,903, filed May 14, 2018.

IBM, List of IBM Patents or Patent Applications Treated as Related, Jul. 15, 2019, 2 pages.

* cited by examiner

DISPLAY REGION FILTERING BASED ON PRIORITY

BACKGROUND

The present disclosure relates generally to the field of electronic displays, and more particularly display region filtering in electronic displays.

Electronic displays (e.g., screens) are used to present images, text, or videos to users. Content can be displayed on a screen via pixels. Pixels are physical points which are the smallest addressable element in a display device. The characteristics of pixels can be defined based on a bit depth of the pixels, which defines a range of colors covered by the pixels. The clarity of an image displayed on a screen depends on the total number of pixels on the screen. This is known as the screen resolution.

SUMMARY

Embodiments of the present disclosure include a method, computer program product, and system for display region filtering. A pixel priority value for each of a plurality of pixels on a display region can be assigned in response to identifying portions of the display region for prioritization, wherein the pixel priority values indicate a relative importance of each of the pixels, respectively, for viewing based on a magnitude of the pixel priority values. The pixel priority value of each pixel can be compared to a first pixel priority threshold to identify pixels of the plurality of pixels having pixel priority values which do not satisfy the first pixel priority threshold. The pixels of the plurality of pixels having pixel priority values which do not satisfy the first pixel priority threshold can then be deactivated, wherein a subset of pixels satisfies the first pixel priority threshold and remain active.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of electronic displays, and in particular to display region filtering in electronic displays. While the present disclosure is not necessarily limited to such applications, various aspects of the disclosure may be appreciated through a discussion of various examples using this context.

While mobile devices today have improved batteries, saving energy is a constant need. Various features already exist that are capable of reducing power consumption in devices. For example, "battery saver" or "low power" modes exist which automatically reconfigure features of devices to reduce power consumption. These modes can disable hardware (e.g., GPS interfaces, network interfaces, etc.), reduce screen brightness, alter pixel color (e.g., "night mode" disables/reduces blue colors), slow down processes (e.g., reduce processing speeds), prevent networking features (e.g., temporarily suspend downloads), and the like. Though these mechanisms can be effective in extending battery life, they may not be ideal in every situation. For example, reducing screen brightness can lead to difficulty viewing content and reducing processing speed can lead to reduced performance. Accordingly, alternative mechanisms for reducing power consumption are sought.

Aspects of the present disclosure relate to display region filtering. A priority value can be defined for each pixel of a plurality of pixels displayed on a display screen. The priority value may indicate the relative importance of each pixel for viewing. The priority value for each pixel can then be compared to a pixel priority threshold. In some embodiments, the pixel priority threshold is triggered in response to a particular condition (e.g., a remaining battery charge level or current processor utilization) in a device associated with the display screen. In some embodiments, the pixel priority threshold can be manually triggered (e.g., via user selection). A determination can be made whether the pixel priority threshold is satisfied for each pixel. Each pixel which does not satisfy the pixel priority threshold can then be deactivated. In some embodiments, deactivation includes setting the pixel bit value for each pixel which is indicated to be deactivated to a black color (e.g., (0, 0, 0) in the 24-bit Red Green Blue (RGB) color space).

Embodiments of the present disclosure provide a solution for reducing power consumption. By selectively deactivating pixels based on priority values (e.g., importance), pixels in critical areas remain visible while pixels in insignificant areas (e.g., the background) are deactivated (e.g., "turned off"). This can lead to significant power savings, as in many instances, a large portion of a display screen may not be necessary for viewing. For example, in some instances, 50-90% of pixels in a screen can be deactivated. This directly reduces the power consumed by the display portion (e.g., light elements) of a device.

Aspects of the present disclosure are advantageous compared to preexisting solutions for reducing power consumption. For example, "power saver" modes which reduce screen brightness affect every pixel of the screen. This can lead to difficulty viewing important features displayed on the screen. In contrast, embodiments provide a solution which only affects portions of a display which may not be important for viewing (e.g., based on pixel priority values). Accordingly, in embodiments, important features displayed on a display screen may not be altered, whereas brightness reduction solutions affect the visibility of every pixel on the screen.

Further, embodiments may not negatively impact performance of a device. In preexisting solutions where features are disabled (e.g., GPS and/or network features) and/or processes are slowed down (e.g., clock speed is reduced), the performance of the device is negatively affected. In contrast, embodiments of the present disclosure may avoid negative performance impacts while reducing power consumption in non-critical areas.

Figure 1:
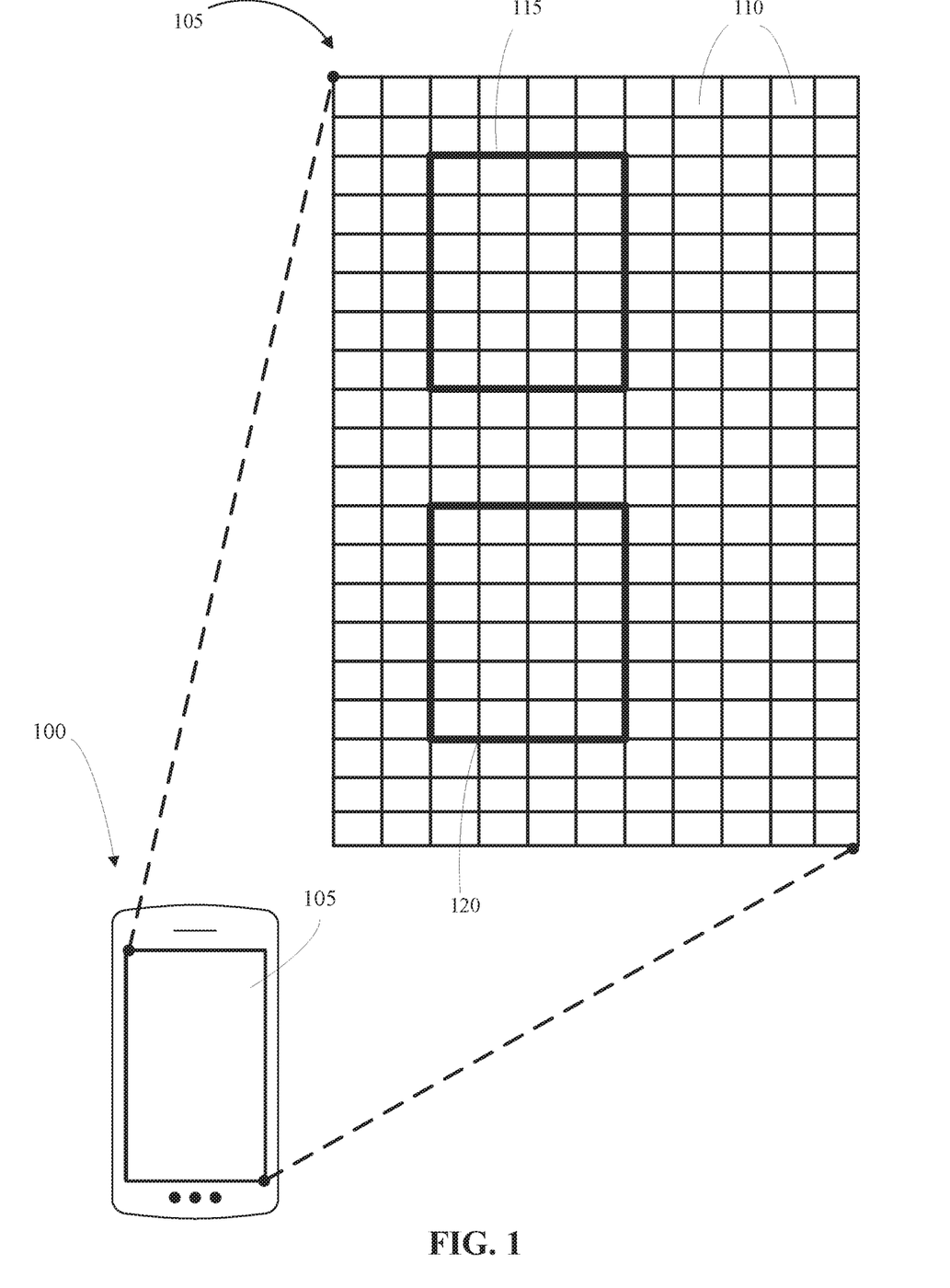
FIG. 1 is a diagram illustrating pixels of a display screen, in accordance with embodiments of the present disclosure.

Referring now to the figures, FIG. 1 is a diagram illustrating pixels 110 displayed on a mobile device 100, in accordance with embodiments of the present disclosure. The mobile device 100 includes a display screen 105. The display screen 105 is comprised of a plurality of pixels 110. The pixels 110 include a first subset of pixels 115 and a second subset of pixels 120.

According to aspects of the present disclosure, the mobile device 100 can include a battery which provides power to the mobile device 100. Throughout use of the mobile device 100, the battery charge may be expended using various features of the mobile device 100. For example, utilizing the CPU (central processing unit), RAM (random access memory), storage (e.g., SSD (solid state drives)), camera, flashlight, NIC (network interface controller), and other common mobile device features can expend the battery charge level. Additionally, displaying images, videos, or text on the display screen 105 can expend the mobile device's 100 battery charge level. By actively using one or more of these features of the mobile device 100, the charge in the battery can be depleted, requiring a user to recharge the battery.

Aspects of the present disclosure reduce power consumption of display devices by selectively activating (e.g., turning "on" or enabling) and deactivating (e.g., turning "off" or disabling) pixels. Specifically, pixels corresponding to low priority display regions (e.g., regions of a display not typically used or required for viewing) can be deactivated. Reducing the number of activated pixels (e.g., currently illuminated pixels) can lead to significant power savings, depending on how many pixels are deactivated.

As depicted in FIG. 1, the display screen 105 includes a plurality of pixels 110. The pixels 110 can be assigned individual priority values (e.g., values which indicate the relative importance of each pixel for a user to view). Based on the priority values assigned to each of the pixels 110, particular pixels can be deactivated. In some embodiments, each pixel which does not satisfy a pixel priority threshold can be deactivated. For example, if a pixel priority scale ranges from 1-10, with 1 being the highest priority and 10 being the lowest priority, and a pixel priority upper limit threshold is 5 (e.g., only priority values of 1-5 satisfy the pixel priority threshold), each pixel which has a priority value from 6-10 will be deactivated. This can allow a user to view and access high priority regions of the mobile device 100, while reducing power consumption in non-critical areas.

Following the example above, if each pixel of the first subset of pixels 115 has a priority value of 2 and each pixel of the second subset of pixels 120 has a priority value of 4, and the rest of pixels on the display screen 105 have a priority value of 9, then only the first and second subsets of pixels 115, 120 would be activated. Each pixel having a priority value of 9 can then be deactivated, as these pixels are indicated as low priority.

The priority of pixels 110 can be defined based on objects (e.g., text, buttons, icons, images, etc.) the pixels 110 represent. For example, if mobile device 100 is currently displaying a "home screen", there may be various icons which correspond to respective applications (e.g., "messages", "web browser", "games", "music", etc.). There may also be a background image and one or more indicators (e.g., a battery level indicator, a time indicator, a signal strength indicator, etc.) displayed on the display screen 105. The pixels associated with the applications and indicators can then be defined as high priority, while the pixels associated with the background can be defined as low priority. Based on a pixel priority threshold, only the high priority pixels may be displayed, while the low priority pixels (e.g., the background) may be deactivated. This ensures that all important (e.g., commonly used, significant, etc.) portions of the display screen 105 are active, while restricting power in non-critical areas of the display. In this example, the only remaining active portions of the display may be the applications and indicators.

In some embodiments, deactivating pixels based on priority thresholds can be triggered in response to a particular condition (e.g., power level, processor utilization, network utilization, etc.) of the device. For example, the mobile device 100 can have two displays modes triggered based on battery level thresholds. The first display mode can be a "low power mode" which can be triggered at 30% remaining battery level. The second display mode can be a "critical power mode" which can be triggered at 10% remaining battery level. Following the example above where the pixel priority range spans from 1-10 with 1 being the highest priority and 10 being the lowest priority, if the first subset of pixels 115 corresponds to an application icon (e.g., "messages"), the first subset of pixels 115 may be defined as having a priority value of 2. If the second subset of pixels 120 corresponds to an indicator (e.g., a signal strength indicator), the second subset of pixels 120 may be defined as having a priority value of 4. The background pixels (e.g., all pixels not included in the first and second subsets of pixels 115, 120) may be defined as having a priority value of 9. When the battery charge level of the mobile device 100 drops to 30% power, the "low power mode" activates, and a first priority threshold is triggered. If the first priority threshold is 5 (e.g., any pixels having a priority value from 6-10 are deactivated), both the first and second subsets of pixels 115, 120 remain active, while the background pixels are deactivated. When the "critical power mode" activates in response to the battery charge level of the mobile device 100 dropping to 10% power, a second pixel priority threshold of 3 (e.g., any pixels having a priority value from 4-10 are deactivated) is triggered. In response to the "critical power mode", the second subset of pixels 120 are deactivated, as they do not satisfy the second pixel priority threshold. Accordingly, upon activation of the "critical power mode", the first subset of pixels 115 are the only remaining active pixels of the display screen 105, while the second subset of pixels 120 and the background pixels are deactivated.

Though FIG. 1 depicts a mobile device 100 with an exemplary number of pixels 110, in embodiments, any number of pixels can be implemented on the display screen 105. Pixel density and/or screen resolution can vary. For example, the pixel density can be TVDPI (medium high density (150-213 pixels per inch (ppi))), HDPI (high density (213-240 ppi)), XHDPI (eXtra high density (240-320 ppi)), XXHDPI (eXtra eXtra high density (320-480 ppi)) or XXX-HDPI (eXtra eXtra eXtra high density (480-640 ppi)). Further, screen resolution can be 800×600, 1024×600, 1280×1024, 1440×900, 1920×1080 (e.g., 1080p), 2560×1440, 3840×2160 (Ultra High Definition (UHD)), 4096×2160 (e.g., 4K), and 8192×4320 (e.g., 8K), to name a few.

While the first and second subsets of pixels 115, 120 depict rectangular shapes with a specific number of pixels, in embodiments, the first and second subsets of pixels 115, 120 can be any shape having any number of pixels. In embodiments, the first and second subsets of pixels 115, 120 correspond to specific "objects" (e.g., application icons, text, buttons, windows, etc.) that the first and second subsets of pixels 115, 120 represent (e.g., based on display data). For example, if an object (e.g., a chat window) is a 2 in by 2 in square having a pixel density of 100 ppi, the first subset of pixels 115 can be a 200 by 200 pixel square. In some embodiments, the first and second subsets of pixels 115, 120 can be specified by a user.

Further, though the individual pixels 110 depicted in FIG. 1 are substantially square-shaped, in embodiments, pixels can be any other suitable shape. For example, the pixels can be rectangular, circular, triangular, etc. The pixel density depends on the geometry of the pixels as well as the dimensions of the display screen 105. A described herein, pixels can have one or more color components. For example, each pixel can have a red, green, and blue (RGB) color component.

Any suitable display technology can be implemented, in accordance with embodiments of the present disclosure. For example, organic light-emitting diode (OLED) technology can be implemented in the mobile device 100. OLED technology includes an emissive electroluminescent layer that emits light in response to an electrical current. The OLED display can include a passive matrix (PMOLED) or an active matrix (AMOLED). OLED pixels emit their own light, such that a backlight is not required. This enables the ability to turn on and off individual pixels. Further, OELD technology provides high contrast ratios, deep black levels, and allows manufacturing thin, lightweight displays.

LCD light emitting diode (LED) systems can also be implemented in the mobile device 100. LED systems can include edge-lit LEDS, LED arrays, or direct LED (DLED) pixels. DLED technology can allow each pixel to generate its own light, enabling color control at the pixel level (as opposed to clusters of pixels as in edge-lit or non-DLED arrays). In technologies that implement control over clusters of pixels, embodiments of the present disclosure may selectively deactivate low-priority clusters rather than individual low-priority pixels. This may lead to some "high priority" being deactivated and some "low priority" pixels remaining active, depending on the specific pixel-to-light source mappings.

Though reference is made to a mobile device 100 (e.g., a smart phone, laptop, tablet computer, smart watch, wearable, etc.) having a battery, in embodiments, the present disclosure can be implemented to reduce power consumption in systems without batteries. For example, the present disclosure can be implemented in systems powered by a power supply unit (PSU) connected to an outlet (e.g., monitors communicatively coupled to desktop computers, mainframes, servers, and the like) or televisions.

With reference to "pixel priority values" (e.g., priority values) and "pixel priority thresholds" (e.g., priority thresholds), though examples are provided with specific numerical values and ranges, it is noted that these are merely exemplary, and any suitable numerical representations and/or ranges can be implemented. For example, pixel priority values and/or pixel priority thresholds can be denoted as integers, decimals, irrational numbers, negative numbers, imaginary numbers, and the like.

Figure 2:
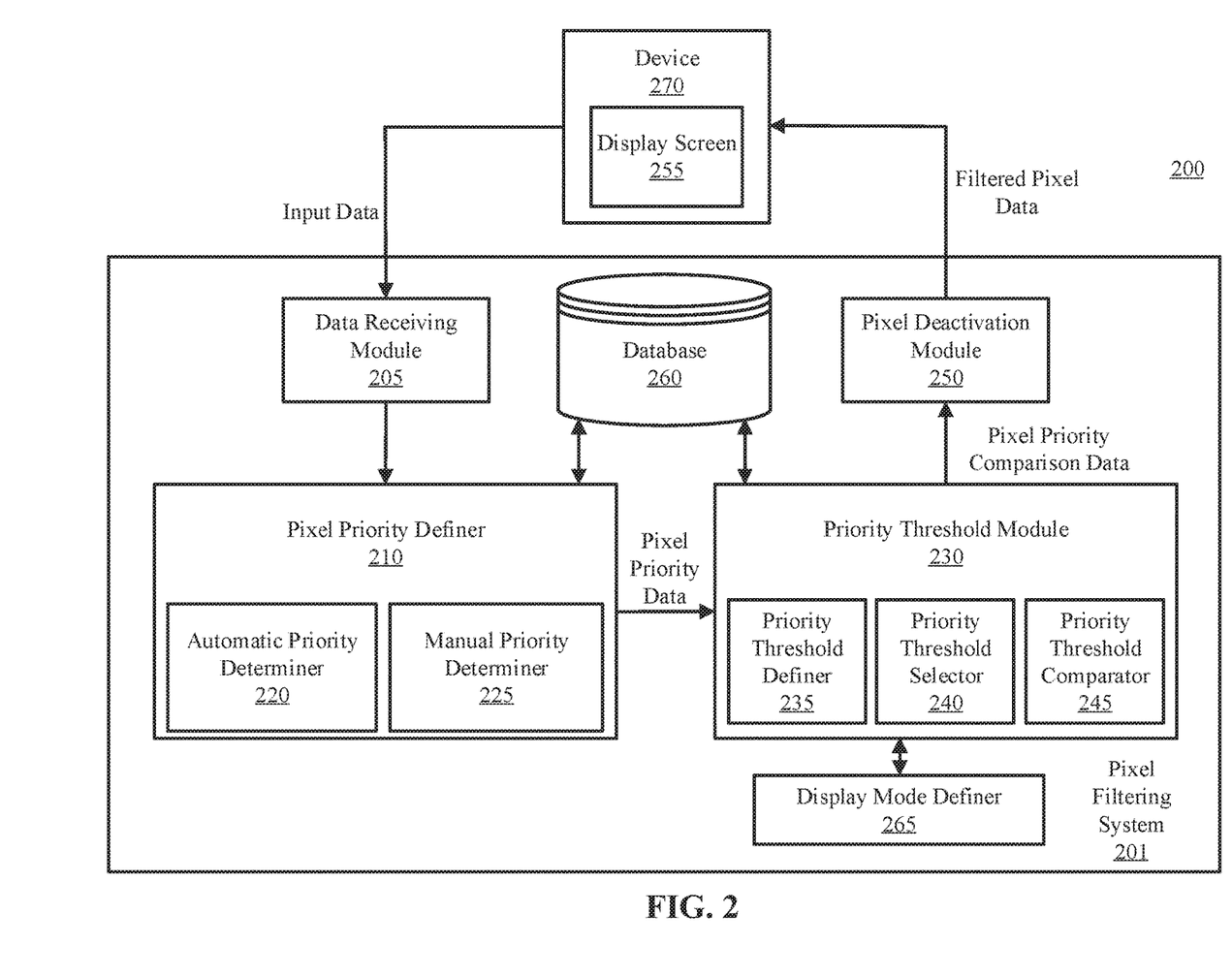
FIG. 2 is a block diagram illustrating a pixel filtering system communicatively coupled to a device, in accordance with embodiments of the present disclosure.

FIG. 2 is a block diagram illustrating a computing environment 200 including a pixel filtering system 201 communicatively coupled to a device 270 (e.g., mobile device 100 of FIG. 1) having a display screen 255 (e.g., display screen 105 of FIG. 1), in accordance with embodiments of the present disclosure. The pixel filtering system 201 includes a data receiving module 205, a pixel priority definer 210, a priority threshold module 230, a display mode definer 265, a database 260, and a pixel deactivation module 250.

The data receiving module 205 receives input data from the device 270. The input data can include operating system (OS) data, application data, display data (e.g., pixel density and display dimensions associated with the display screen 255), device usage data (e.g., CPU utilization data, power usage data, network utilization data of the device 270), user specified data, and other sources of data. In some embodiments, the data receiving module 205 retrieves input data from the device 270 on a pull-basis. In some embodiments, the data receiving module 205 receives data as pushed by the device 270. The data receiving module 205 dispatches the input data to the pixel priority definer 210.

The pixel priority definer 210 defines a pixel priority for each pixel (e.g., pixels 110 of FIG. 1) associated with the display screen 255 of the device 270 (e.g., mobile device 100, a desktop computer, a server computer, etc.). The pixel priorities defined by the pixel priority definer 210 can be used to determine whether certain pixels (e.g., the first and second subsets of pixels 115, 120 of FIG. 1) of the display screen 255 are to remain active or be deactivated. The pixel priority definer 210 can use display data (e.g., pixel density, pixel addresses, and/or display dimensions (vertical/horizontal dimensions of the display screen 255)) to define priorities for specific pixels. As an example, for a display screen of m×n pixels, where m is the number of columns and n is the number of rows, the pixel priority definer 210 can define pixel priorities by specific rows, columns, submatrices, or individually addressable pixels within the pixel matrix.

The pixel priority definer 210 includes an automatic priority determiner 220 and a manual priority determiner 225. The automatic priority determiner 220 can be configured to automatically (e.g., without user intervention) determine the priority value of specific pixels. The manual priority determiner 225 can be configured to determine the value of specific pixels based on user specified data.

In some embodiments, the automatic priority determiner 220 utilizes metadata associated with files (e.g., OS or program files) to automatically determine the priority of displayed pixels. For example, in some embodiments, the automatic priority determiner 220 analyzes metadata to determine the relative usage of interactive features (e.g., buttons, scroll bars, windows, search bars, hyperlinks, etc.) associated with an OS or application. The metadata may indicate which portions of the display the user typically interacts with as well as the functions the displayed features have. Function and/or usage of features indicated in metadata can then be used automatically assign priority values to pixels via the automatic priority determiner 220.

For example, in a "home screen" of a mobile device, OS data may indicate application icons which are frequently interacted with, application icons which are moderately interacted with, and application icons that are infrequently interacted with (e.g., based on a number of application launches indicated for each respective application or based on a time spent in each application). Based on the interactions associated with each application icon, the automatic priority determiner 220 can determine priority values for the pixels associated with the application icons. In this example, the automatic priority determiner 220 can set high priority values for the pixels associated with the frequently accessed application icons (e.g., 1, if the priority scale spans from 1-10 with 1 being the highest priority and 10 being the lowest priority), intermediate priority values for the pixels associated with the moderately accessed application icons (e.g., 3), and low priority values for the pixels associated with the infrequently accessed application icons (e.g., 5).

As another example, for an application with a chat interface, the automatic priority determiner 220 may be configured to determine which portions of the chat interface are frequently used and which portions of the chat interface are infrequently used (e.g., based on metadata included in the chat interface program file). In this example, a chat window and chat entry box may be frequently used, while "buttons" for an emoji input, a file attachment, and a text bolder may be infrequently used. In this instance, the automatic priority determiner 220 may assign high priority values to pixels associated with the chat window and chat entry box and low priority values to pixels associated with the buttons for the emoji input, file attachment, and text bolder. Accordingly, the automatic priority determiner 220 can be configured to automatically assign pixel priority values to pixels of the display screen 255 based on the function and usage of features displayed on the screen as indicated in metadata.

In some embodiments, the automatic priority determiner 220 can be configured to assign pixel priority values based on which portions of the display screen 255 a user looks at. For example, the automatic priority determiner 220 can receive eye-tracking data from the device 270. The eye-tracking data may indicate which portions of a display a user focuses on, and which portions of a display are not focused on. For example, the eye tracking data can measure the rotation of the eye with respect to a certain frame of reference. This can be used to determine which subsets of pixels a user views. The automatic priority determiner 220 can then assign pixel priority values based on what the user typically views. In some embodiments, the automatic priority determiner 220 can be configured to assign high priority values to portions of the display screen 255 (e.g., subsets of pixels) which are frequently viewed (e.g., as indicated by the eye tracking data) and low priority values to portions of the display screen 255 which are infrequently viewed.

In some embodiments, the automatic priority determiner 220 utilizes current display data (e.g., an image currently being displayed on the display screen 255) to automatically define priority values. In these embodiments, the automatic priority determiner 220 can utilize pixel data (e.g., pixel bit values, pixel color, pixel contrast, etc.) to automatically assign priority values.

For example, if the display screen 255 of the device 270 displays various application icons on a white background, the pixel bit values for each application icon can be compared to the pixel bit values of the white background. In this example, the pixels of the white background may all share a common bit value (e.g., a bit value of 255 on grayscale or 255 for each color component for the Red Green Blue (RGB) color space (255, 255, 255)) while the pixels associated with the application icons may have a variety of different bit values. For each subset of pixels having a pixel perimeter which is substantially non-white (e.g., the bit values are not equal to 255 on grayscale or the bit values are not equal to 255 for each color component in the RGB color space), a determination can be made that all pixels within each subset of pixels having a non-white perimeter is distinct from the background and thus constitutes an application icon (or other object). Each pixel associated with each respective application icon can then be assigned respective priority values (e.g., which can depend on how frequently each application is launched), while the white background can be assigned a low priority value.

In some embodiments, to differentiate a background portion from an object portion of a display, a number of pixels having the same bit value are determined. If the number of pixels having the same bit value for a given display resolution exceeds a threshold number of pixels (e.g., based on the total number of pixels), a determination can be made that the pixels having the same bit value correspond to a background portion. All pixels having a different bit value can then be defined as an object portion. For example, if a display has 10,000 total pixels, and a threshold number of pixels to define a background portion is 6,000, if 8,000 pixels share a common bit value, a determination can be made that the 8,000 pixels comprise the background portion.

As another example, the automatic priority determiner 220 can be configured to automatically assign priority values for text displayed on the display screen 255. In this example, the automatic priority determiner 220 can be configured to determine which pixels are associated with a background portion and which pixels are associated a text portion based on a comparison of the pixel bit values displayed on the screen. In this example, all bit values associated with the background portion may share a common bit value (e.g., 255 if the pixels are white on a grayscale, or (255, 255, 255) if all pixels are white on an RGB color space) while all pixels associated with the text may share a different value (e.g., 0 if they are black on grayscale or (0, 0, 0) if they are black on the RGB color space). Based on the comparison of the bit values between the text and the background, the automatic priority determiner 220 can be configured to automatically set all pixels associated with the background as a low priority, and all pixels associated with the text as a high priority. In this instance, upon application of a pixel priority threshold, the background may not satisfy the pixel priority threshold, and the pixels associated with the background can be deactivated. If the text is already black (e.g., the text now melds in with the background), the pixel filtering system 201 may be configured to alter the pixel color of the pixels associated with the text such that they contrast with the background (e.g., turn the text from black to white), allowing a user to read the text while conserving power by disabling all pixels associated with the background.

In some embodiments, the automatic priority determiner can be configured to resize objects displayed on the display screen 255. For example, if a particular scrollable portion (e.g., the object) of an application occupies one half of the pixels on a given display, the automatic priority determiner 220 can be configured to resize the scrollable portion such that it takes up a smaller subset of pixels (e.g., one fourth of the display). In these embodiments, the automatic priority determiner 220 can be configured to redefine the pixel priority values of the display such that the resized object maintains its respective priority values prior to resizing. For example, if an object is displayed on a first subset of pixels prior to resizing, the automatic priority determiner 220 may assign the first subset of pixels a first priority value. The automatic priority determiner 220 may then resize the object such that it is displayed on a second subset of pixels, wherein the second subset of pixels is smaller than the first subset of pixels. The automatic priority determiner 220 can then be configured to update the first and second subsets of pixel priority values, such that the object maintains its priority values prior to resizing. This can be implemented to reduce the amount of pixels occupied by objects, such that a greater number of pixels of the display screen 255 can be deactivated.

While reference is made to grayscale (e.g., 2-bit) and the RGB color space (e.g., 24-bit) for specific pixel bit values, any suitable pixel bit depth can be implemented. In embodiments, pixel bit depth can be 1-bit (e.g., binary, monochrome, black and white), 2-bit (e.g., grayscale), 8-bit (e.g., video graphics array (VGA)), 12-bit (4096 possible colors), 18-bit (262,144 possible colors), 24-bit (RGB color space, 16 million possible colors, "True Color"), 30-bit ("Deep Color" having more than 1 billion possible colors) 36-bit, 48-bit, etc.

The manual pixel priority determiner 225 can be configured to utilize user input data (e.g., as received by the data receiving module 205) to define pixel priorities. In some embodiments, the pixel filtering system 201 can prompt a user to define pixel priorities for pixels currently displayed on the display screen 255. For example, pixel filtering system 201 can present a user with a graphical user interface (GUI) that allows selection of pixels currently displayed on a screen (e.g., on a pixel selection menu). In response to selecting (e.g., by a touch gesture on a touch screen or using a mouse pointer) one or more subsets of pixels on the screen, the user can specify priority values for each respective subset of pixels (e.g., on a priority defining menu). The priority values specified by the user can then be received by the data receiving module 205, and forwarded to the manual priority determiner 225 for priority value assignment based on the user's selections.

As an example, for a crossword puzzle (e.g., in a gaming application) displayed on the display screen 255 of the device 270, a user may only desire to view specific portions of the crossword puzzle to conserve energy. In this example, the pixel filtering system 201 may prompt the user to select specific pixels (e.g., individual pixels or subsets of pixels) of the display screen 255 and set the priority values for the respective pixels. The user may select, using a touch gesture (e.g., if the display screen 255 is a touch screen), all pixels associated with the word input boxes and word box clues of the crossword puzzle. Because these are the actively used portions of the display when solving the crossword puzzle, the user may define the priorities of the pixels associated with the word input boxes and word box clues as "high" (which can be indicated numerically). The user can then set the priority for all other pixels (e.g., the background and any other portions of the display) displayed on the display screen 255. In some embodiments, this can be completed manually by the user selecting and defining pixel priority values for every other pixel. In some embodiments, this can be completed using a function that automatically selects all unselected pixels. For example, the user can select an option on a GUI to automatically select all pixels with undefined values. The pixels with undefined values can then be assigned priority values. In this example, all pixels with an undefined value may be set to low priority. Upon activation (e.g., execution, triggering, setting, application, etc.) of a pixel priority threshold, only the pixels associated with the word input boxes and word box clues may remain active, and all other pixels may be deactivated.

Various input commands can be used to select pixels (e.g., individual pixels or clusters of pixels). For example, touch gesture commands, mouse pointer commands, visual queue commands (e.g., using a camera to track eye position relative to the display screen 255), keyboard commands (e.g., specific keystrokes on a keyboard), and the like can be used to select pixels. Further, the pixel selection commands can be used to select any suitable number of pixels. In some embodiments, input commands used to select pixels can allow selection of pixels of a particular geometric dimension. Various size/shape selection options may be available. These may include circles, squares, rectangles, pentagrams, etc. having particular dimensions (e.g., specified in units of measurement or pixels). The selection geometries may be configured to be "dragged" along the screen to select large subsets of pixels.

As an example, a user may be prompted (e.g., via a GUI) to select pixels on a display screen 255, and in response to the user being prompted, the user may use a mouse pointer command to select a subset of pixels. The user may input a "left click" command to begin pixel selection. The selection option may be a 30 pixel diameter circle with the center point being at the pointer of the mouse. The user can then drag the mouse pointer while "left clicking" to select a larger subset of pixels. Once the user selects the sought subset of pixels, the user may define pixel priority values (e.g., via a GUI menu) for the selected subset. The user's pixel priority value selections can then be received by the manual priority determiner 225, and can be defined accordingly.

In some embodiments, the user can specify priority values based on specific pixel rows, columns, submatrices, or addresses. In these embodiments, the pixel filtering system 201 may present a GUI to a user with dimensions for a total pixel matrix (e.g., m×n pixels). The GUI may allow the user to specify priority values for particular pixel regions (e.g., rows, columns, submatrices, addresses, etc.) within the total pixel matrix, and allow the user to assign priority values for each respective pixel region. The pixel priority data specified by the user can then be received by the data receiving module 205 and dispatched to the manual priority determiner 225 such that each priority value is properly assigned based on the user's selections.

For example, for a 1920×1080 resolution display, a menu may be presented to a user to allow the user to specify pixel priority values for particular rows (e.g., from 1-1080), columns (e.g., from 1-1920), addresses (e.g., pixel (1000, 500)) or submatrices (e.g., rectangular shaped pixel subsets within the total 1920×1080 perimeter). In this instance, the user may specify that the first and last 5 rows of display should be low priority, while the rest of the pixels should be high priority. Accordingly, the user can select the first and last 5 row (e.g., rows 1-5 and rows 1076-1080) and the set priority value to low. The user can then assign a high priority value for the remaining pixels.

In some embodiments, the manual priority determiner 225 can be configured to rewrite previously defined pixel priority values. For example, if the automatic priority determiner 220 defined pixel priority values for a given display screen, the manual priority determiner 225 can be configured to rewrite the previously defined priority values (e.g., based on a user's selection). In an example, if the automatic priority determiner 220 specified that pixels associated with a particular application (e.g., a tax preparation/filing application) icon that a user recently stopped using were high priority (e.g., based on metadata included in the tax preparation/filing application), the user can rewrite the priority values to low and the manual priority determiner 225 can redefine the priority values per the user's selections.

Similarly, the automatic priority determiner 220 can be configured to rewrite pixel priority values. For example, if a user specified pixel priority values for a given display screen, the automatic priority determiner 220 can be configured to "refine" the pixel priorities defined by the manual priority determiner 225. As an example, if a user specified pixel priority values of an object (e.g., an application icon) using a touch gesture (e.g., the user used a touch screen to select a subset of pixels and define the priority of the subset of pixels), the automatic priority determiner 220 can be configured to "clean up" the user's manual selection. In this example, the automatic priority determiner 220 may be configured to determine particular pixels of the subset of pixels selected by a user which do not correspond to the object highlighted by the user (e.g., based on pixel bit value comparisons). Alternatively, the automatic priority determiner 220 can be configured to determine particular pixels which do correspond to the object highlighted by the user but were not selected. In response to determining which pixels do correspond to the object but were not selected/defined, and in response to determining which pixels do not correspond to the object but were selected/defined, the automatic priority determiner 220 can rewrite the priority values for those particular pixels.

In some embodiments, the pixel priority definer 210 stores priority value templates in the database 260 based on priorities values determined by the automatic and manual priority determiners 220, 225. The priority value templates can be used to automatically define priority values for a given display screen based on previously defined priority values. For example, if a user manually defined all priority values for pixels displayed in a music application, the next time the user launches the music application, the same priority values can be automatically assigned based on a template generated and stored for the music application. This can allow a user to store (e.g., in the database 260) various templates for respective display screens. For example, the user can have a first priority value template for a "home screen", a second priority value template for a first application, a third priority value template for a second application, a fourth priority value template for a first website, a fifth priority value template for a second website, etc.

In some embodiments, priority value templates are mapped to specific applications, websites, or display screens. For example, in response to launching an application (e.g., with predefined pixel priority values), a corresponding template can be automatically retrieved and applied (e.g., executed). As another example, in response to navigating to a particular internet domain, a priority value template corresponding to that particular domain (e.g., website) can be retrieved and executed. In some embodiments, the priority value templates are retrieved based on display data. For example, if the pixels on a given display screen match pixel data stored in a priority value template (e.g., the pixel bit values correspond), the priority value template having the corresponding pixels can be automatically retrieved and executed.

The pixel priority definer 210 can be configured to "track" objects (e.g., text, icons, windows, characters (e.g., humans, fictional characters, animals, etc.), things (e.g., a lamp, couch, desk, pen, basketball, etc.), etc. displayed on a screen) as they change positions in real-time and maintain pixel priority values for respective objects. For example, certain display screens may include scrollable features that allow objects to be moveable along the screen. Further, objects in videos can change pixel positions from frame to frame. In these embodiments, the pixel priority definer 210 can be configured to determine that a particular object having pixel priority values in a first subsection of pixels (e.g., at a first time) has transitioned to a second position (e.g., at a second time) along the pixel matrix, such that the object is now displayed in a second subset of pixels. The pixel priority definer 210 can then be configured to automatically transfer the pixel priority values from the first subset of pixels to the object's new position in the second subset of pixels.

After pixel priorities are defined by the pixel priority definer 210, the pixel priority data (along with any other required data, such as system status data) is dispatched to the pixel threshold module 230. The pixel threshold module 230 includes a priority threshold definer 235, a priority threshold selector 240, and a priority threshold comparator 245. The pixel threshold module 230 can be configured to dictate when particular pixels should be displayed based on their defined pixel priority values. Specifically, the priority threshold definer 235 can define one or more pixel priority thresholds, the priority threshold selector 240 can activate (e.g., select, trigger, apply, etc.) a priority threshold of the one or more defined priority thresholds, and the priority threshold comparator 245 can compare the pixel priority values to the selected priority threshold to determine whether the pixel priority thresholds are satisfied.

The priority threshold definer 235 can be configured to define one or more pixel priority thresholds. The pixel priority thresholds are used to determine whether or not particular pixels should be activated or deactivated. Specifically, particular pixel priority values associated with individual pixels (e.g., as defined by the pixel priority definer 210) are compared with pixel priority thresholds by the priority threshold comparator 245, and based on the comparison, a determination is made whether or not to activate/deactivate the individual pixels. In some embodiments, pixels can be deactivated in response to the pixel priority values not satisfying the pixel priority threshold (e.g., the pixel priority value exceeds an upper limit or falls below a lower limit). In some embodiments, pixels can be activated in response to the pixel priority values satisfying the pixel priority threshold (e.g., the pixel priority value falls below an upper limit or exceeds a lower limit).

The pixel priority threshold definer 235 can define pixel priority thresholds based on a range of factors. The value of each pixel priority threshold depends on the range of possible pixel priority values (e.g., for a pixel priority value range from 0-100, the pixel priority threshold must be within 0-100). The pixel priority thresholds can be upper or lower limit thresholds, which may depend on the priority order (e.g., ascending or descending) of the pixel priority values. In some embodiments, the pixel priority values can be equal to (e.g., greater than or equal to, less than or equal to) the defined priority thresholds while satisfying the pixel priority thresholds.

The priority threshold selector 240 selects and activates at least one pixel priority threshold of the pixel priority thresholds defined by the priority threshold definer 235. In some embodiments, the priority threshold selector 240 activates pixel priority thresholds automatically based on device metrics. For example, in response to a particular battery charge level, power draw, processor utilization, network utilization, etc. the priority threshold selector 240 may select and activate a particular priority threshold. In some embodiments, the pixel priority threshold selector 240 activates priority thresholds according to display modes defined by a display mode definer 265. In some embodiments, the pixel priority selector 240 selects and activates pixel priority thresholds based on user specified data. For example, if data received by a user indicates activation of a particular threshold, the priority threshold selector 240 can activate the threshold per the user's selection.

The display mode definer 265 can define various display modes for the device 270. The display modes can dictate when particular pixel priority thresholds are triggered by the priority threshold selector 240. Accordingly, different pixels can be activated and/or deactivated based on the display modes specified by the display mode definer 265. For example, three display modes for a device can be "high power mode", "medium power mode", and "low power mode". Each mode may trigger a different pixel priority threshold. In an example, a pixel priority value range may span from 0-100, with 0 being the lowest priority and 100 being the highest priority. In this example, the "high power mode" may trigger a first priority threshold having a lower limit of 20 (e.g., any pixel having a priority value lower than 20 does not satisfy the first threshold, and thus is deactivated), the "medium power mode" may trigger a second priority threshold having a lower limit of 55 (e.g., any pixel having a priority value lower than 55 does not satisfy the second threshold, and thus is deactivated), and the "low power mode" may trigger a third priority threshold having a lower limit of 80 (e.g., any pixel having a priority value lower than 80 does not satisfy the third threshold, and thus is deactivated). By implementing different display modes/priority thresholds, control over the display of pixels having differing priority values can be attained. This allows important pixels to be displayed to a user when power conservation is needed and less important pixels to be displayed to the user when power conservation is not a concern.

In some embodiments, the display mode definer 265 can define display modes based on system metrics. Display modes can be defined based on various system metrics. For example, display modes can be defined based on measured charge levels (e.g., remaining charge in a battery), processor utilization, power draw (e.g., watts being drawn from an outlet) or network utilization (e.g., current downloads/uploads). For example, the three display modes described above (e.g., the "high power mode", "medium power mode", and "low power mode") can be activated by the priority threshold selector 240 based on different battery charge level thresholds. In this example, the "high power mode" may be triggered in response to the battery level dropping to 80% power, the "medium power mode" may be triggered in response to the battery level dropping to 50% power, and the "low power mode" may be triggered in response to the battery level dropping to 20% power. Based on the different display mode triggers, the priority threshold selector 240 can select the appropriate pixel priority threshold(s) corresponding to each respective display mode.

Similarly, the priority threshold selector 240 can select and apply specific priority thresholds based on system metrics. As described herein, "display modes", are not necessarily required to trigger priority thresholds. Rather, priority thresholds can be automatically activated based on system metric thresholds by the priority threshold selector 240. Following the example above, a first pixel priority threshold may be triggered in response to the battery level dropping to 80% power, a second pixel priority threshold may be triggered in response to the battery level dropping to 50% power, and a third pixel priority threshold may be triggered in response to the battery level dropping to 20% power.

In some embodiments, current processor utilization can be used to trigger display modes and/or pixel priority thresholds. For example, a first pixel priority threshold (e.g., 20%) can be triggered at a first processor utilization (e.g., 50%), a second pixel priority threshold (e.g., 50) can be triggered at a second processor utilization (e.g., 70%), and a third pixel priority threshold (e.g., 70) can be triggered at a third processor utilization (e.g., 90%). This can be executed to reduce power consumption caused by the display screen 255 in response to an increase in power consumption by the processor. This can also aid in mitigating the amount of processing required by the processor (e.g., by reducing graphics processing). In this embodiment, the first processor utilization of 50% may activate the "high power mode", the second processor utilization of 70% may activate the "medium power mode", and the third processor utilization of 90% may activate the "low power mode".

In some embodiments, display modes and/or pixel priority thresholds can be triggered based on network utilization. For example, a first network utilization (e.g., download or upload bitrate, such as 30 mbps) value can trigger a first display mode (e.g., high power mode) which activates a first pixel priority threshold (e.g., 50) and a second network utilization (e.g., 60 mbps) value can trigger a second display mode (e.g., low power mode) which activates a second pixel priority threshold (e.g., 80).

In some embodiments, the rate of change of the battery charge level can be used in activating pixel priority thresholds and/or display modes. For example, if the battery is dropping by 3% per minute, a first display mode having a first priority threshold can be triggered, if the battery charge level if dropping by 2% per minute, a second display mode having a second priority threshold can be triggered, and if the battery charge level is dropping 1% per minute, a third display mode having a third priority threshold can be triggered. This can be used to counteract the rate at which the battery level is depleting. Accordingly, when the battery power level is rapidly dropping, only the highest priority pixels are presented. As the rate of depletion of the battery power level decreases, more pixels (e.g., intermediate or low priority pixels) can be presented to the user.

Though reference is made to battery charge level in terms percentage (e.g., 100% at full power→0% at depletion), in embodiments, the battery charge level is represented by coulombs or ampere hours. For example, the amount of charge in the battery can be measured in milliamp hours (mAhrs), and one or more pixel priority thresholds/display modes can be issued based on different milliamp hour measurements.

In some embodiments, the display mode definer 265 allows a user to select a display mode. For example, the display mode definer 265 can be configured to prompt a user to select a display mode (e.g., high power, medium power, low power) in a menu. In some embodiments, the display mode definer 265 provides a notification to a user upon activation of a display mode. For example, if a medium power display mode is activated at 50% remaining battery charge, the display mode definer 265 may transmit a notification to the display screen 255 to notify the user that the medium power display mode was activated.

Display modes defined by the display mode definer 265 can be stored in the database 260. Accordingly, particular display modes (e.g., low power mode), corresponding system metric triggers (e.g., 30% charge remaining), and corresponding priority thresholds (e.g., an upper limit of 30) can be stored in the database 260. Display mode templates (e.g., a set of data constituting a particular display setting) can be stored in the database 260. For example, a first display mode template may include a "high power mode" having a first priority threshold (e.g., 50) triggered by a first processor utilization (e.g., 50%) and a "low power mode"

having a second priority threshold (e.g., 70) triggered by a second processor utilization (e.g., 70%). A second display mode template may include a "power saver mode" having a third priority threshold (e.g., 80) triggered by a first power draw (e.g., 1000 W) and a "critical power mode" having a fourth priority threshold (e.g., 90) triggered by a second power draw (e.g., 1500 W). Accordingly, any number and/or type of display mode templates can be stored in and retrieved from the database 260.

In some embodiments, priority thresholds can be manually defined and selected by a user. For example, the priority threshold definer 235 may receive user provided data defining one or more pixel priority thresholds for pixels displayed on the display screen 255. The user can then manually select a pixel priority threshold of the one or more defined pixel priority thresholds to be activated. The user specified data can be received by the priority threshold definer 235 and/or priority threshold selector 240 such that priority thresholds are defined and selected per the user's request.

The pixel priority threshold comparator 245 compares each pixel priority value for each pixel defined by the pixel priority definer 210 to the activated threshold selected by the priority threshold selector 240. A determination is then made whether pixel priority values for each respective pixel satisfy the activated priority threshold. For example, if a priority value range spans from 0-1000, with 0 being the highest priority and 1000 being the lowest priority, and a pixel priority upper limit threshold is set to 200, any pixel having a pixel priority value greater than 200 will be determined to not satisfy the pixel priority threshold. The comparison data (e.g., indications regarding whether each pixel satisfies the activated pixel priority threshold) is transmitted to the pixel deactivation module 250.

The pixel deactivation module 250 deactivates each pixel which does not satisfy the pixel priority threshold set by the priority threshold module 230. Deactivating pixels can be completed in any suitable manner. In some embodiments, deactivating pixels is completed by altering pixel bit values (e.g., the pixel color). For example, for each pixel which is indicated to be deactivated (e.g., based on the comparison data from the priority threshold comparator 245), a pixel bit value can be set such that the pixel is turned off. For example, in a 24-bit RGB color space, all pixels which are indicated to be turned off can be set to (0, 0, 0) such that the pixels are changed to black. As another example, in a 2-bit grayscale color space, all pixels which are indicated to be deactivated can be set to 0 such that the pixels are changed to black. By turning the pixel bit values to black, corresponding LEDs or OLEDs mapped to the deactivated pixel can be deactivated.

In some embodiments, the pixel deactivation module 250 can deactivate pixels by preventing control signals which update the pixel bit values. This can be completed in any suitable addressing scheme (e.g., direct addressing with m×n control signals or matrix addressing with m+n control signals). Control signals which are intended to update pixel bit values or change light element (e.g., LED/OLED) characteristics (e.g., the state (on/off) and brightness of light) can be ceased, blocked, or intercepted. This can be used to prevent pixels from being activated, deactivate pixels, or deactivate light sources (e.g., light elements, such as OLEDs or LEDs) corresponding to individual pixels.

In some embodiments, deactivating pixels can merely include "dimming" light elements (e.g., OLEDs and LEDs) corresponding to particular pixels or clusters of pixels. For example, if light elements are mapped to each pixel, deactivation can include reducing power provided to the light elements corresponding to pixels which did not satisfy the pixel priority threshold such that the pixels are dimmed. This can reduce the power consumed by low priority pixels, while not necessarily completely deactivating the pixels. In some embodiments, determining whether to dim and/or deactivate can be completed based on pixel priority values. For example, "dimming" can be completed at a first pixel priority threshold, while "deactivating" can be completed at a second pixel priority threshold. For example, if a pixel priority range spans from 0-10, with 10 being the highest priority and 0 being the lowest priority, and if a first pixel priority threshold to "dim" pixels is a lower limit of 5, while a second pixel priority threshold to deactivate pixels is a lower limit of 2, any pixels having a pixel priority value from 5-10 will remain active, any pixels having a pixel priority value from 2-5 will be dimmed, and any pixels having a pixel priority value from 0-2 will be deactivated.

The filtered pixel data (e.g., the altered addressing scheme data, modified pixel bit values, or modified signals transmitted to light elements corresponding to pixels) can then be transmitted to the device 270, such that the display data output on the display screen 255 is updated per the filtered pixel data. This allows the filtered pixel data to overlay the original image data, such that pixels are displayed subject to the priority values and thresholds defined by the pixel filtering system 201.

Figure 3:
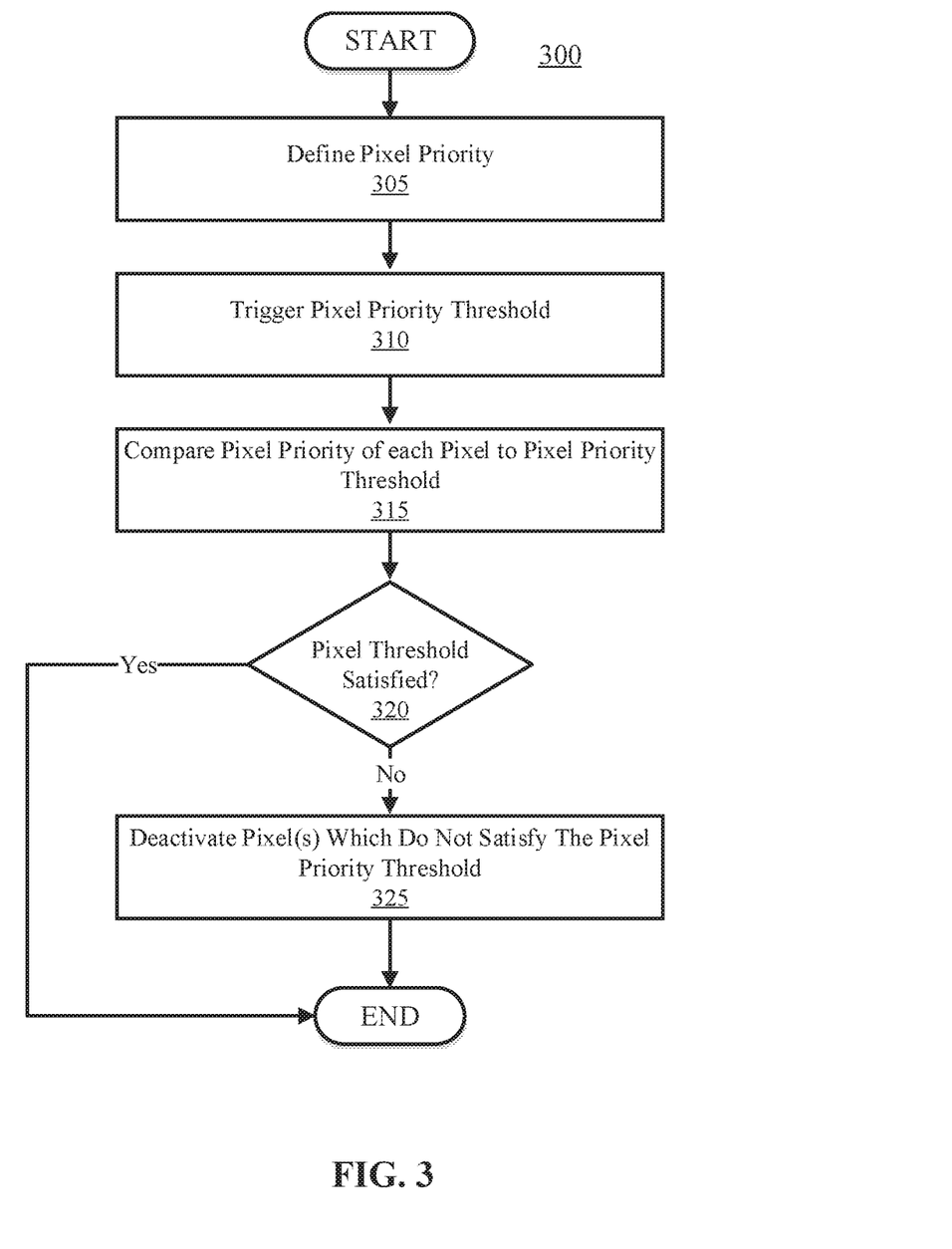
FIG. 3 is a flow diagram illustrating a method for filtering pixels according to a pixel priority threshold, in accordance with embodiments of the present disclosure.

Referring now to FIG. 3, shown is a flow-diagram illustrating an example method 300 for filtering pixels output by a display screen, in accordance with embodiments of the present disclosure. As referenced in FIG. 3, pixels, subsets of pixels, display screen, and device may be the same as or substantially similar to the pixels 110, the first and second subsets of pixels 110, 115, the display screen 105, and the mobile device 100 described in FIG. 1. Further, as referenced in FIG. 3, the display screen and device may be the same as or substantially similar to the display screen 255 and device 270 described in FIG. 2.

Method 300 initiates where a pixel priority for each pixel of a plurality of pixels on a display screen is defined. This is illustrated at step 305. Pixel priority can be defined automatically (e.g., without user intervention) and/or manually (e.g., based on user input). For example, as described in FIG. 2, pixel priority can be automatically defined based on the functions and/or usage of features (e.g., buttons, scroll bars, chat windows, application icons, functional objects, etc. displayed on a screen) indicated in metadata. In some embodiments, any pixels associated with functional features (e.g., buttons, display indicators, icons, text, etc.) are automatically assigned "high priority" values, while pixels associated with nonfunctional features (e.g., background, peripheral vision, etc.) are automatically assigned "low priority" values. For example, if a priority scale spans from 0.0 to 1.0 in increments of 0.1, with 1.0 being the lowest priority and 0.0 being the highest priority, pixels associated with functional features can be defined as having a priority value of 0.2 while pixels associated with nonfunctional features can be defined as having a priority value of 0.8.

Pixel priority can be automatically defined based on a display data (e.g., bit values of pixels). For example, based on a comparison of pixel bit values, an object portion of pixels and a background portion of pixels can be identified (e.g., based on a threshold number of pixels having corresponding bit values). Based on the identification, the object portion of pixels can be defined as "high priority" (e.g., as indicated in the priority value based on the priority scale) while the background portion of pixels can be defined as "low priority".

In embodiments, pixel priority can be manually defined by a user. For example, a user can be prompted (e.g., by presenting a GUI to the user) to select a subset of pixels via a command (e.g., a touch gesture command, a mouse pointer command, a keyboard command, etc.). The user can then specify a priority value for the selected subset of pixels. This can be completed for all pixels on a display screen. In some embodiments, all unselected/undefined pixels can be selected/defined by the user. For example, a user can be prompted to set a priority value for all undefined pixels in the pixel matrix. This can allow the user to specify pixel priority values for a variety of objects on a display screen, and further allow the user to set priority values for the remaining pixels (e.g., the background, blank space, filler, etc.).

In some embodiments, a user can specify pixel priority according to specific pixel matrix regions (e.g., rows, columns, addresses, submatrices). In these embodiments, a GUI may be provided to a user having a region selection window. The region selection window may allow the user to specify specific rows, columns, addresses, or submatrices within the pixel matrix. Upon selecting pixels via the region selection window, the GUI may present the user with a pixel priority defining menu, which allows the user to set particular priority values for particular pixel regions.

After pixel priority values are assigned to each pixel of the plurality of pixels, at least one pixel priority threshold is triggered. This is illustrated at step 310. In some embodiments, the at least one pixel priority threshold is automatically triggered. For example, a pixel priority threshold can be triggered based on a condition of a device (e.g., mobile device 100 of FIG. 1 or device 270 of FIG. 2). Conditions pixel priority thresholds are triggered based on include, but are not limited to, remaining charge level (e.g., of a battery), power draw, processor utilization, network utilization, and the rate of change of any of these metrics. In some embodiments, conditions which trigger priority thresholds are defined in display modes.

In some embodiments, the at least one pixel priority threshold is triggered by a user. For example, a user can select a pixel priority threshold to be triggered, and manually activate the pixel priority threshold. In some embodiments, this is completed by selecting a display mode having a particular pixel priority threshold.

The pixel priority for each pixel of the plurality of pixels is then compared to the triggered pixel priority threshold. This is illustrated at step 315. A determination is then made whether the triggered pixel priority value is satisfied for each individual pixel. This is illustrated at step 320. For example, if a pixel priority value scale spans from 0-20, with 0 being the lowest priority and 20 being the highest priority, and if an active pixel priority lower limit threshold is 15, any pixel with a pixel priority value lower than 15 will be determined to not satisfy the triggered pixel priority threshold, while any pixel having a pixel priority value of 15 or higher will be determined to satisfy the pixel priority threshold. If the triggered pixel priority threshold is not satisfied, each pixel having a priority value which did not satisfy the pixel priority threshold is deactivated. This is illustrated at step 325. If the pixel priority threshold is satisfied, method 300 terminates.

Deactivating each pixel which does not satisfy the pixel priority threshold can be completed in any suitable manner. In some embodiments, pixels are set to a black color, such that light elements (e.g., OLEDs and LEDs) corresponding to pixels are deactivated. In some embodiments, pixels are dimmed by reducing the amount of power provided to light elements corresponding to pixels. In some embodiments, deactivation can include preventing signals transmitted to pixels which control/up the respective pixels' colors. However, deactivation of pixels can be completed in any suitable manner otherwise consistent herein.

Figure 4:
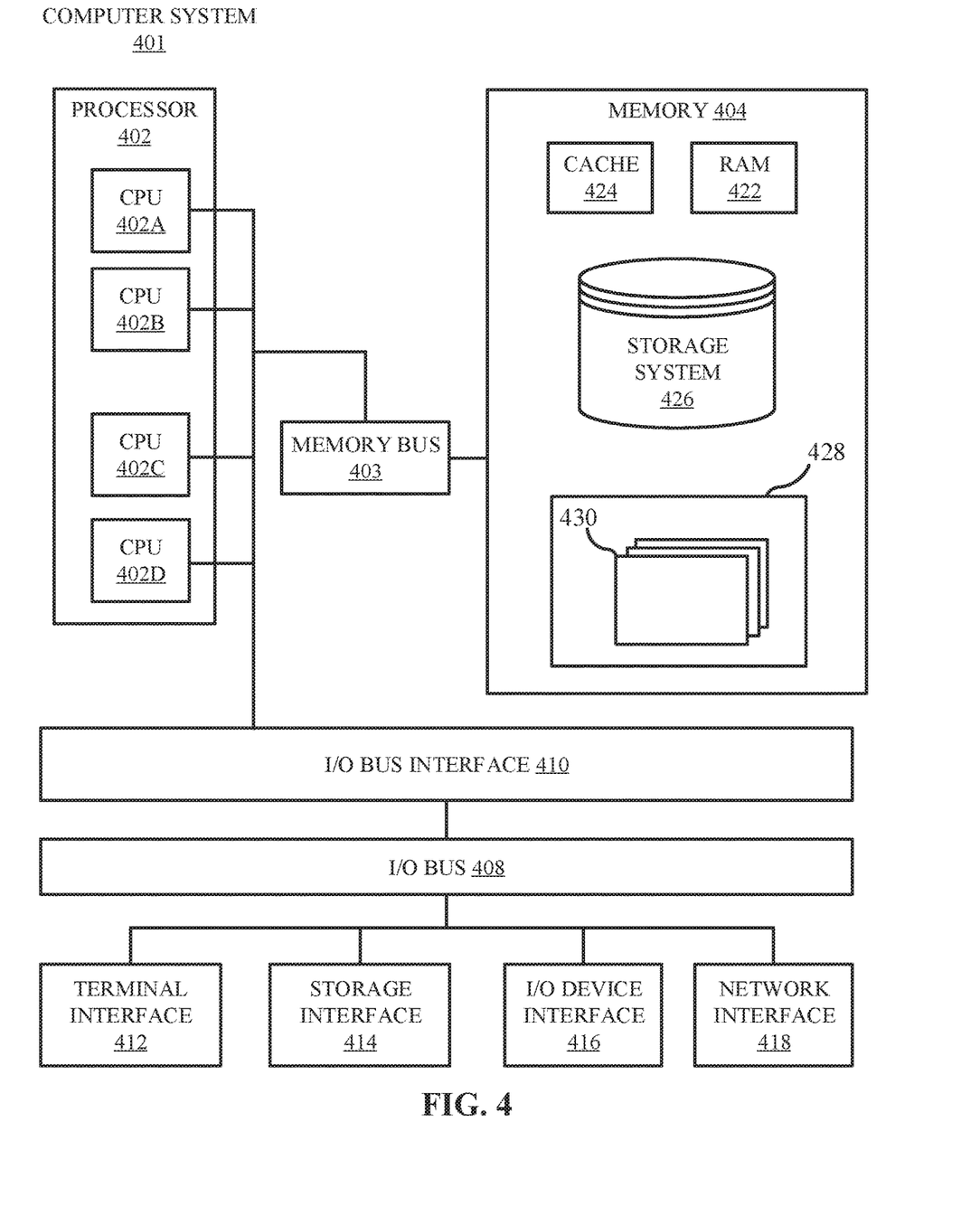
FIG. 4 depicts a high-level block diagram of an example computer system that may be used in implementing one or more of the methods, tools, and modules, and any related functions described herein (e.g., using one or more processor circuits or computer processors of the computer), in accordance with embodiments of the present disclosure.

Referring now to FIG. 4, shown is a high-level block diagram of an example computer system 401 (e.g., mobile device 100 of FIG. 1 and device 270 of FIG. 2) that can be used in implementing one or more of the methods, tools, and modules, and any related functions, described herein (e.g., using one or more processor circuits or computer processors of the computer), in accordance with embodiments of the present disclosure. In some embodiments, the major components of the computer system 401 can comprise one or more CPUs 402, a memory subsystem 404, a terminal interface 412, a storage interface 414, an I/O (Input/Output) device interface 416, and a network interface 418, all of which can be communicatively coupled, directly or indirectly, for inter-component communication via a memory bus 403, an I/O bus 408, and an I/O bus interface unit 410.

The computer system 401 can contain one or more general-purpose programmable central processing units (CPUs) 402A, 402B, 402C, and 402D, herein generically referred to as the CPU 402. In some embodiments, the computer system 401 can contain multiple processors typical of a relatively large system; however, in other embodiments the computer system 401 can alternatively be a single CPU system. Each CPU 402 can execute instructions stored in the memory subsystem 404 and can include one or more levels of on-board cache.

System memory 404 can include computer system readable media in the form of volatile memory, such as random access memory (RAM) 422 or cache memory 424. Computer system 401 can further include other removable/non-removable, volatile/non-volatile computer system storage media. By way of example only, storage system 426 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 404 can include flash memory, e.g., a flash memory stick drive or a flash drive. Memory devices can be connected to memory bus 403 by one or more data media interfaces. The memory 404 can include at least one program product having a set (e.g., at least one) of program modules that are configured to carry out the functions of various embodiments.

One or more programs/utilities 428, each having at least one set of program modules 430 can be stored in memory 404. The programs/utilities 428 can include a hypervisor (also referred to as a virtual machine monitor), one or more operating systems, one or more application programs, other program modules, and program data. Each of the operating systems, one or more application programs, other program modules, and program data or some combination thereof, can include an implementation of a networking environment. Programs 428 and/or program modules 430 generally perform the functions or methodologies of various embodiments.

In some embodiments, the program modules 430 of the computer system 401 can include a pixel filtering module. The pixel filtering module can be configured to define pixel priority values for a plurality of pixels displayed on a display screen. This can be completed automatically (e.g., without user intervention) or manually (e.g., based on user specified data). The pixel filtering module can also be configured to define and select at least one pixel priority threshold. The pixel priority values for each pixel can then be compared to the at least one pixel priority threshold, and a determination can be made whether each pixel satisfies the pixel priority threshold. Each pixel which does not satisfy the pixel priority threshold can then be deactivated by the pixel filtering module. The pixel filtering module can then update the display screen per the filtered data.

Although the memory bus 403 is shown in FIG. 4 as a single bus structure providing a direct communication path among the CPUs 402, the memory subsystem 404, and the I/O bus interface 410, the memory bus 403 can, in some embodiments, include multiple different buses or communication paths, which can be arranged in any of various forms, such as point-to-point links in hierarchical, star or web configurations, multiple hierarchical buses, parallel and redundant paths, or any other appropriate type of configuration. Furthermore, while the I/O bus interface 410 and the I/O bus 408 are shown as single respective units, the computer system 401 can, in some embodiments, contain multiple I/O bus interface units 410, multiple I/O buses 408, or both. Further, while multiple I/O interface units are shown, which separate the I/O bus 408 from various communications paths running to the various I/O devices, in other embodiments some or all of the I/O devices can be connected directly to one or more system I/O buses.

In some embodiments, the computer system 401 can be a multi-user mainframe computer system, a single-user system, or a server computer or similar device that has little or no direct user interface, but receives requests from other computer systems (clients). Further, in some embodiments, the computer system 401 can be implemented as a desktop computer, portable computer, laptop or notebook computer, tablet computer, pocket computer, telephone, smart phone, network switches or routers, or any other appropriate type of electronic device.

It is noted that FIG. 4 is intended to depict the representative major components of an exemplary computer system 401. In some embodiments, however, individual components can have greater or lesser complexity than as represented in FIG. 4, components other than or in addition to those shown in FIG. 4 can be present, and the number, type, and configuration of such components can vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method for filtering a display region of a computing device, the method comprising:
    assigning a pixel priority value to each of a plurality of pixels on the display region, in response to identifying portions of the display region for prioritization, wherein the pixel priority values are a numerical representation of the relative importance of each of the pixels, respectively, for viewing based on a magnitude of the pixel priority values;
    comparing the pixel priority value of each of the plurality of pixels to a first pixel priority threshold defined in a first display mode to identify pixels of the plurality of pixels having pixel priority values which do not satisfy the first pixel priority threshold; and
    deactivating the pixels of the plurality of pixels having pixel priority values which do not satisfy the first pixel priority threshold, a subset of pixels of the plurality of pixels satisfying the first pixel priority threshold and remaining active.

2. The method of claim 1, further comprising:
    comparing the pixel priority value of each pixel of the subset that satisfied the first pixel priority threshold to a second pixel priority threshold defined in a second display mode; and
    deactivating each pixel of the subset of pixels that satisfied the first pixel priority threshold having a pixel priority value which does not satisfy the second pixel priority threshold.

3. The method of claim 2, wherein the first display mode is activated at a first battery charge level, wherein the second display mode is activated at a second battery charge level, wherein the second battery charge level is lower than the first battery charge level.

4. The method of claim 2, wherein the first display mode is activated at a processor utilization level, wherein the second display mode is activated at a second processor utilization level, wherein the second processor utilization level is lower than the first processor utilization level.

5. The method of claim 2, wherein the first display mode is activated at a first network utilization level, wherein the second display mode is activated at a second network utilization level, wherein the second network utilization level is lower than the first network utilization level.

6. The method of claim 1, wherein defining the pixel priority for each of the plurality of pixels comprises:
   providing a graphical user interface (GUI) to a user which allows the user to select, using a command, a selected subset of the plurality of pixels;
   receiving the command from the user to select the selected subset of the plurality of pixels;
   providing, on the GUI, a pixel priority defining menu, wherein the pixel priority defining menu allows the user to define a pixel priority value for each pixel within the selected subset of pixels;
   receiving the pixel priority value from the user; and
   defining the pixel priority value for each pixel within the selected subset of pixels using the pixel priority value received from the user.

7. The method of claim 1, wherein defining the pixel priority value for each of the plurality of pixels comprises:
   collecting metadata from an application;
   determining, by analyzing the collected metadata, a number of interactions associated with each of a plurality of features in the application; and
   defining, based on the number of interactions associated with each of the plurality of features, the pixel priority for pixels corresponding to each of the plurality of features.

8. The method of claim 1, wherein defining the pixel priority for each of the plurality of pixels comprises:
   obtaining bit values of each pixel of the plurality of pixels;
   comparing the bit values of each pixel to determine an object portion of pixels and a background portion of pixels; and
   defining, based on determining the object portion of pixels and the background portion of pixels, a first pixel priority value for each pixel of the object portion of pixels and a second pixel priority value for each pixel of the background portion of pixels;
   wherein the pixel priority value of each pixel of the background portion of pixels does not satisfy the first pixel priority threshold, wherein each pixel of the background portion pixels is deactivated in response to the first pixel priority threshold not being satisfied.

9. The method of claim 1, wherein deactivating each pixel having a pixel priority value which does not satisfy the first pixel priority threshold comprises:
   setting the pixel bit value of each pixel having a pixel priority value which does not satisfy the first pixel priority threshold to a value corresponding to black.

10. The method of claim 1, wherein the display region is organic light-emitting diode (OLED) display.

11. The method of claim 1, wherein the display region is a liquid crystal display (LCD).

12. The method of claim 11, wherein pixel priority values are assigned to clusters of pixels, each cluster corresponding to a particular light source within the display.

13. The method of claim 1, wherein defining the pixel priority value for each of the plurality of pixels comprises:
   collecting metadata from an operating system (OS);
   determining, by analyzing the collected metadata, interactive features within the operating system; and
   defining the pixel priority for pixels corresponding to the interactive features as a first pixel priority level.

14. The method of claim 13, wherein the first pixel priority level satisfies the first pixel priority threshold.

15. The method of claim 1, wherein defining the pixel priority value for each of the plurality of pixels comprises:
   collecting a set of eye-tracking data;
   determining, by analyzing the set of eye-tracking data, portions of a display a user focuses on; and
   defining the pixel priority for pixels corresponding to the portions of the display the user focuses on as a first pixel priority level.

16. The method of claim 15, wherein the first pixel priority level satisfies the first pixel priority threshold.

\* \* \* \* \*